United States Patent [19]
Meininger et al.

[11] 4,014,865
[45] Mar. 29, 1977

[54] GOLDEN-YELLOW FIBER-REACTIVE WATER-SOLUBLE MONOAZO DYESTUFFS

[75] Inventors: Fritz Meininger, Frankfurt am Main; Ludwig Schlafer, Fischbach, Taunus, both of Germany

[73] Assignee: Hoechst Aktiengesellschaft, Frankfurt am Main, Germany

[22] Filed: June 26, 1975

[21] Appl. No.: 590,576

[30] Foreign Application Priority Data

June 29, 1974 Germany .......................... 2431343

[52] U.S. Cl. .............................................. 260/163
[51] Int. Cl.² .......................................... C09B 29/38
[58] Field of Search ................................... 260/163

[56] References Cited

UNITED STATES PATENTS 3,655,642  4/1972  Meininger et al. ............. 260/162 X

FOREIGN PATENTS OR APPLICATIONS 1,150,163  6/1963  Germany ........................ 260/163

Primary Examiner—Charles F. Warren
Attorney, Agent, or Firm—Curtis, Morris & Safford

[57] ABSTRACT

Monoazo compounds having in form of the free acid the formula

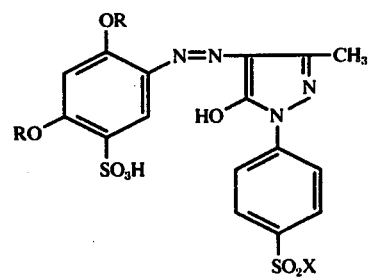

in which R represents alkyl from 1 to 4 carbon atoms and X represents vinyl, β-chloroethyl, β-dialkylaminoethyl, β-thiosulfatoethyl, β-phosphatoethyl or β-sulfatoethyl, said compounds representing dyestuffs being suitable for the dyeing and printing of native and synthetic nitrogen-containing fibers and being highly suitable for the dyeing or printing of cellulose fibers, yielding on said fibrous materials dyeings and prints of a rare and desired golden-yellowish tint of considerable tinctorial strength, excellent build-up and good to very good fastness properties.

2 Claims, No Drawings

GOLDEN-YELLOW FIBER-REACTIVE WATER-SOLUBLE MONOAZO DYESTUFFS

The present invention relates to golden-yellow novel water-soluble monoazo compounds, a process for preparing them and their use as dyestuffs.

The present invention provides novel valuable golden-yellow water-soluble monoazo compounds which correspond, in the form of their free acid, to the general formula (1)

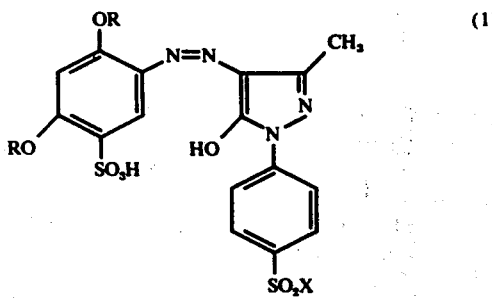

wherein R represents an alkyl radical having from 1 to 4 carbon atoms, preferably the methyl or ethyl group, and X stands for the vinyl, the β-chloroethyl, β-thiosulfatoethyl, β-phosphatoethyl, β-sulfatoethyl or a β-dialkylaminoethyl group having from 1 to 4 carbon atoms in each alkyl radical, preferably the β-dimethylaminoethyl and the β-diethylaminoethyl group.

Of the compounds of the formula (1), in addition to the free acids, particularly the alkali metal salts and the alkaline earth metal salts, preferably the sodium and potassium salts, are interesting.

The present invention also provides a process for the preparation of these compounds, which comprises coupling a diazotized amine corresponding - as amine and in the form of the free acid - to the general formula (2)

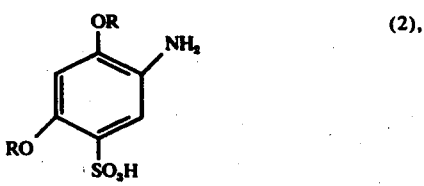

wherein R is defined as above, with a coupling component of the general formula (3)

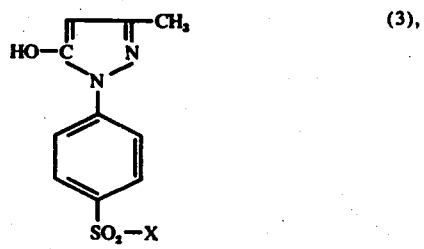

wherein X is defined as above or represents the β-hydroxyethyl group, and esterifying in monoazo compounds of the general formula (1), wherein X represents the β-hydroxyethyl group, in known manner the β-hydroxyethylsulfonyl group to give the β-sulfato- or the β-phosphatoethylsufonyl group or converting the former into the β-chloroethylsulfonyl group, these groups optionally being converted also into one of the other groups X mentioned more above, possibly via the vinylsulfonyl group.

The conversion of compounds of the general formula (1), in which X stands for the group —CH$_2$—CH$_2$—OH, into those compounds of the formula (1), wherein X stands for the β-sulfatoethyl group, is effected in known manner by way of sulfating agents, for example, concentrated or anhydrous sulfuric acid, chlorosulfonic acid, amidosulfonic acid or compounds yielding sulfur trioxide. For the conversion of compounds of the general formula (1), wherein X stands for the group —CH$_2$—CH$_2$—OH, into those compounds of the formula (1), in which X represents the β-phosphatoethyl group, use is made of phosphating agents, for example, concentrated orthophosphoric acid, pyrophosphoric acid and polyphosphoric acid or phosphorus oxychloride.

Furthermore, the compounds of the formula (1) containing a vinyl-sulfonic group can be prepared from compounds of the formula (1) containing a β-sulfatoethylsulfonyl or a β-chloroethylsulfonyl group, by the action of inorganic compounds showing an alkaline reaction, such as sodium carbonate or sodium hydroxide, in an aqueous solution having a pH value of from about 10 to 12 at a temperature in the range of from about 10° to 40° C.

The pyrazolone derivatives of the general formula (3), wherein X stands for the β-hydroxyethyl group, which derivatives are used for the preparation of the novel monoazo compounds, can be converted in the above-mentioned manner into compounds of the formula (3), wherein X represents the radicals β-sulfatoethyl or β-phosphatoethyl. Pyrazolone derivatives of the general formula (3), wherein X represents β-thiosulfatoethyl or β-dialkylamino-ethyl, can be prepared, as has been described above, for compounds of the formula (1), from compounds of the general formula (3), in which X represents the vinyl radical, by way of reaction with dialkylamines or by reactions with salts of the thiosulfuric acid. In an analogous manner — such as has been described for the vinylsulfonyl compounds of the formula (1) — the pyrazolones of the formula (3) containing a vinylsulfonyl group can also be prepared.

The isolation of the monoazo compounds that can be obtained according to the methods described is effected by a salting-out process, for example, with sodium or potassium chloride, or by the spray drying of the preparation mixture.

The novel compounds of the present invention which correspond, in the form of the free acids, to the formula (1), have proved to be valuable dyestuffs which are particularly suitable for the dyeing and printing of nitrogen-containing fiber materials, such as wool, silk, leather, polyurethane and polyamide fiber materials, and are also excellently suitable for the dyeing and printing of native or regenerated cellulose fiber materials, for example, cotton, staple fiber, viscose rayon, and linen. The vinylsulfonyl and the β-sulfatoethylsulfonyl compounds in particular show good dyeing properties.

The novel dyestuffs which correspond to the formula (1) yield dyeings and prints of a rare and desired golden-yellow shade.

The application and fixation of the compounds of the invention onto the materials to be dyed or printed is effected in the manner known in technology for analogous azo dyestuffs containing acid groups and reactive groups. The said compounds can be used in accordance with all dyeing and printing processes that are suitable for this purpose and are common from the technical point of view, especially the dyeing and printing processes for reactive dyestuffs. Thus, the dyeing of nitrogencontaining fibers is carried out from a neutral or acid bath; an alkaline after-treatment or an increase of the pH value of the dye bath may be effected subsequently.

The products of the invention are applied onto cellulose materials according to the methods that are common and known for reactive dyestuffs; as acid-binding agents for the fixation of the dyestuffs there are suitable, in particular, inorganic compounds showing an alkaline reaction, advantageously salts or hydroxides of alkali metals and alkaline earth metals, such as sodium or potassium carbonate, -bicarbonate, -hydroxide, calcium hydroxide, sodium phosphate or -hydrogenophosphate, Na-silicate, but also those compounds which set free — under the action of heat — compounds showing an alkaline reaction, such as sodium or potassium trichloroacetate.

The dyestuffs can be applied onto the fiber according to the batchwise exhaustion method, to the padding process and to printing processes and can be fixed upon dwelling at room temperature as well as by steaming or by a treatment with dry heat.

In the presence of agents having an alkaline reaction, the said dyestuffs yield - in particular on cellulose fibers - dyeings and prints of a good color intensity having always the same color shade, a very good build-up and good to very good fastness properties, of which there are to be mentioned especially the strong fastness to water, to washing at a temperature of from 60° to 95° C, the fastness to gas fading, to alkaline and acid perspiration, the fastness to milling, to cross-dyeing, to alkalis and to light, on dry and moist textile material. The prints obtained with the novel dyestuffs show an excellent clarity of the white ground, they are fast to rubbing and do not bleed onto an adjoining fabric.

The dyestuffs according to the invention are superior to the comparable reddish-yellow monoazo dyestuffs known from German Pat. No. 1 150 163 and the published Japanese Patent Application No. Sho-44-14107, as far as their dyestuff buildup, their dyestuff yield and the constancy of the shade are concerned, with regard to all dyeing and printing processes common for reactive dyestuffs, and also regarding their fastness to water (according to DIN 54006), their fastness to washing, to gas fading, to acid and alkaline perspiration, to milling, to acid cross-dyeing, to alkalis, and to light, on dry and moist textile material. In contrast to the above-mentioned comparable reddish-yellow monoazo dyestuffs, the prints obtained with the novel dyestuffs show an excellent clarity of the white ground, they are fast to rubbing and do not bleed onto an adjoining fabric. Moreover, they show a water-solubility which is superior to that of the comparable reddish-yellow monoazo dyestuffs and also a higher stability of the alkaline printing pastes and padding liquors.

The following Examples serve to illustrate the invention. The "parts by weight" are to the "parts by volume" as is the "kilogram" to the "liter".

EXAMPLE 1

25.5 Parts by weight of 1-amino-2,4-dimethoxy-5-sulfoacid sodium were dissolved in 200 parts by volume of water, were acidified with a mixture of 150 parts by weight of ice and 10 parts by volume of concentrated sulfuric acid and were then mixed with 14 parts by volume of aqueous sodium nitrite solution of 40% strength. The reaction mixture was then stirred for 30 minutes up to 1 hour at a temperature in the range of from 8° to 10° C, and the excess nitrite was destroyed with amidosulfonic acid. 330 Parts by weight of ice and the solution of 31 parts by weight of 3-methyl-1-(4'-β-hydroxyethylsulfonyl)-phenyl-5-pyrazolone in 94 parts by weight of concentrated sulfuric acid of 96% strength were introduced into the above-mentioned solution of the diazonium salt of the said aromatic amine. The neutralization of the reaction mixture and the coupling were effected by adding about 90 parts by weight of calcium carbonate. After the coupling had been completed, the neutral pH value was adjusted to 4 – 5 by means of about 3 parts by weight of semi-concentrated sulfuric acid, and the reaction mixture was heated at 80° C for 1 to 2 hours until the diazonium salt possibly present was destroyed. In order to remove the calcium sulfate, the reaction mixture was suction-filtered in a hot state, and the filter residue was washed with 100 parts by volume of boiling water. The dyestuff being present in the filtrate in the dissolved state was obtained by a salting-out process with sodium chloride, by spray-drying or by evaporating the filtrate. 90 Parts by weight of a 51% dyestuff were obtained which, in the form of the free acid, had the formula

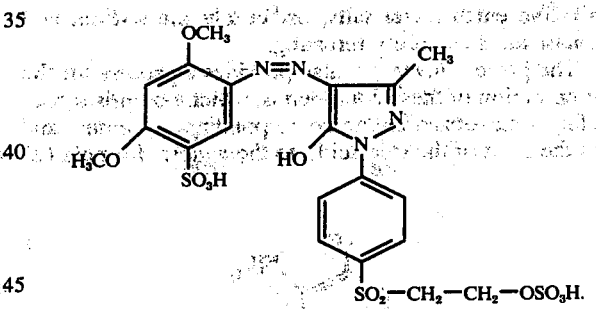

In accordance with all dyeing and printing processes that are common for reactive dyestuffs, the said dyestuff yielded clear golden-yellow dyeings and prints on wool, silk, polyamide and polyurethane fiber materials, as well as on cellulose fiber materials, the dyeings and prints having a good build-up and a very good fastness to wetting, to mention especially the fastness to washing, to water, to boiling soda, to acid and alkaline perspiration, to milling, to cross-dyeing, to gas fading and to alkalis. The prints obtained with this dyestuff showed an excellent sharpness of the outlines and a high clarity of the white ground.

EXAMPLE 2

In the course of 1 hour, 15.3 parts by weight of 2,4-dimethoxyaniline (aminoresorcin-dimethylether) were introduced into 57.5 parts by weight of sulfuric acid of 100% strength and were stirred for 1 hour. In this process, the temperature was not allowed to exceed 65° C. Subsequently, 17.3 parts by weight of oleum of 65% strength were added to the reaction mixture in the course of 1 hour, at a temperature of from 50° to 60° C, and after the oleum had been added, the reaction melt was heated to 70° C and was stirred at this temperature for 1 hour. The melt was stirred onto a mixture of 200 parts by weight of ice and 20 parts by weight of sodium chloride, and after 1 hour the precipitated 2,4-dimethoxyaniline-5-sulfonic acid was suction-filtered. This acid was then suspended in 150 parts by volume of water and was cooled with 50 parts by weight of ice. 14 Parts by volume of an aqueous solution of 40% strength of sodium nitrite were introduced into this suspension, and the mixture was stirred for 1 hour. Subsequently the excess nitrite in the solution of the diazonium salt was eliminated with 0.5 part by weight of amidosulfonic acid. Afterwards 200 parts by weight of ice were added as well as the solution of 31 parts by weight of 3-methyl-1-(4'-β-hydroxyethylsulfonyl)-phenyl-5-pyrozolone in 94 parts by weight of concentrated sulfuric acid of 96% strength. The reaction mixture was neutralized with about 80 parts by weight of calcium carbonate, in which process the temperature was maintained below 12° C by the further addition of ice. The mixture was then stirred for several hours, and its pH value was then adjusted to 4.5 with about 5 parts by volume of semi-concentrated sulfuric acid. The reaction mixture was heated at a temperature of from 80° to 90° C and was stirred for 1 to 2 hours, until no more diazonium salt could be detected. The separated calcium sulfate was collected in a hot state on a suction filter and was washed with 4 portions of 50 parts by volume each time of boiling water. The volume of the reaction mixture was then about 800 parts by volume. The dyestuff was salted out by the addition of 160 parts by weight of common salt. After having been stirred for several hours, the dyestuff was collected on a suction filter, was then washed and dried. 57 Parts by weight of a 76% dyestuff were obtained which - in the form of the free acid — had the constitution mentioned in Example 1 above. This dyestuff also showed all the good fastness properties mentioned above in Example 1.

EXAMPLE 3

26.1 Parts by weight of 1-amino-2,4-diethoxy-5-sulfonic acid were mixed with 9 parts by volume of sodium hydroxide solution (of 33% strength), were dissolved in 200 parts by volume of water and were diazotized, as has been described in Example 1.

The solution of the diazonium salt was adjusted to a pH value of 6 by means of calcinated soda. Subsequently the icecold solution of 28.2 parts by weight of 3-methyl-1-(4'-β-hydroxy-ethylsulfonyl)-phenyl-5-pyrazolone in 200 parts by volume of water and 10 parts by volume of sodium hydroxide solution (of 33% strength) was introduced in the course of 15 minutes, and the mixture was then stirred for some time. The precipitation of the dyestuff was completed with 10% potassium chloride.

The dyestuff was collected on a suction filter and was dried. 71 Parts by weight of a yellowish-brown powder of 65% strength were obtained which - in the form of the free acid — had the formula

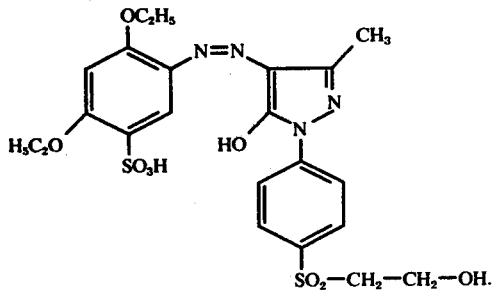

EXAMPLE 4

55.4 Parts by weight of the dyestuff having the constitution given in Example 3 were introduced at room temperature into 170 parts by weight of concentrated sulfuric acid and were stirred until the parts were completely dissolved. The melt was poured onto 500 parts by weight of ice and was neutralized with 175 parts by weight of calcinated soda. The dyestuff was salted out with sodium chloride, was suctionfiltered and dried at 100° C in vacuo. 90 Parts by weight of a 55% dyestuff were obtained which — in the form of the free acid — corresponded to the formula:

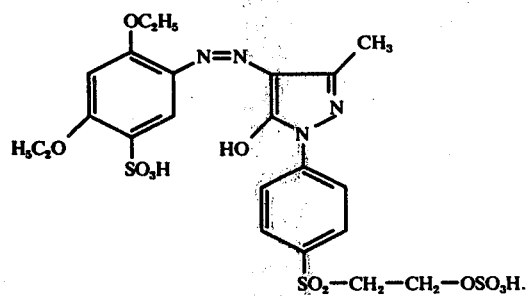

When applied onto the above-mentioned fiber materials, the dyestuff yielded reddish-yellow dyeings and prints having the favorable fastness properties mentioned before.

EXAMPLE 5

60.6 Parts by weight of the dyestuff having the constitution mentioned in Examples 1 and 2 were dissolved in 800 parts by volume of water, the pH value was adjusted to 11 - 12 by means of concentrated sodium hydroxide solution, and the reaction mixture was stirred for 1 hour at room temperature. Subsequently the pH was readjusted with mineral acid to a value of 5, and the dyestuff was salted out with common salt. After it had been isolated and dried, 80 parts by weight of a salt-containing brown powder were obtained which, in the form of the free acid, had the formula

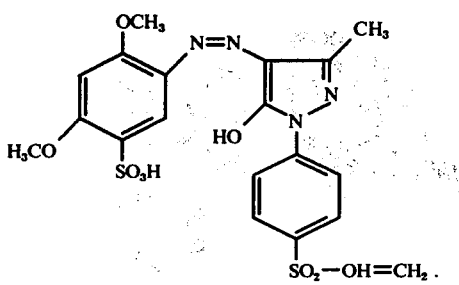

The dyestuff had an excellent absorption capacity and yielded clear golden-yellow dyeings and prints of a good color intensity on wool, silk, polyamide and polyurethane fiber materials, as well as on cellulose fibers, according to all application processes common for reactive dyestuffs, the prints and dyeings having the same good fastness properties as have been described in Example 1.

EXAMPLE 6

50.8 Parts by weight of the dyestuff having the constitution mentioned in Example 5, which had been dissolved in 2000 parts by volume of water, were stirred with 37.5 parts by weight of crystalline sodium thiosulfate for several hours at a temperature in the range of from 60° to 70° C and at a pH value of from 5 to 6. In the course of this process it was necessary to maintain the pH value within the above-mentioned limits by constantly adding diluted acetic acid. The dyestuff solution was subsequently clarified and spray-dried. A yellowish-brown powder was obtained which was easily soluble in water. The dyestuff thus obtained corresponded — in the form of the free acid — to the formula

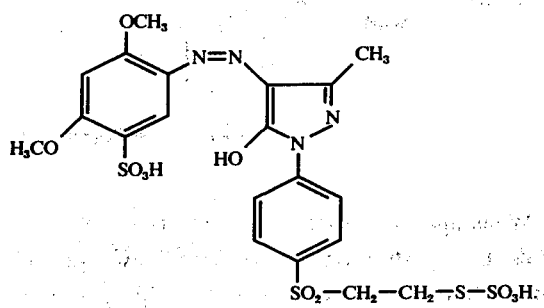

According to all application processes common for reactive dyestuffs to be applied onto nitrogen-containing fibers and cellulose fibers, this dyestuff showed all the advantages and fastness properties mentioned above in Example 1.

EXAMPLE 7

At 30° C, 50.8 parts by weight of the dyestuff having the constitution mentioned in Example 5 in 2000 parts by volume of water were mixed with 80 parts by weight of diethylamine. By adding concentrated sodium hydroxide solution, a pH value of from 11 to 12 was adjusted. After several hours, the pH value was readjusted to 5 – 6 by the addition of an acid, and the dyestuff was salted out with common salt, was suction-filtered and dried in vacuo. 65 Parts by weight of a salt-containing dyestuff were obtained which — in the form of the free acid — had the formula

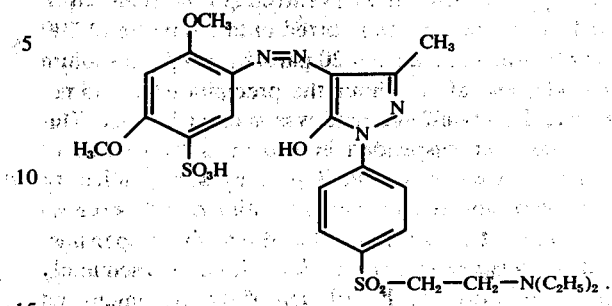

In the presence of agents having an alkaline reaction, the dyestuff yielded on nitrogen-containing fibers and cellulose fibers clear golden-yellow dyeings and prints having the good fastness properties mentioned in Example 1. The dyestuff was very well absorbed from long baths. Printing pastes and padding liquors of the dyestuff which contained agents having an alkaline reaction could be stored for several months at a temperature of about 20° C.

EXAMPLE 8

26.1 Parts by weight of 1-amino-2,4-diethoxy-5-sulfonic acid were neutrally dissolved in 200 parts by volume of water and were diazotized as usual (cf. Example 1). Subsequently the solution of the coupling component was prepared as follows:

30.1 Parts by weight of 3-methyl-1-(4'-β-hydroxyethylsulfonyl)-phenyl-5-pyrazolone were introduced at 100° C into 39.1 parts by weight of polyphosphoric acid of 80% strength (the percentage being calculated on the content of phosphorus pentoxide), and the melt was stirred for 2 hours at 100° C. Subsequently 74 parts by volume of water were added, at a temperature of from 80° to 100° C, the mixture was boiled for 30 minutes, and the reaction solution was cooled. The coupling was effected by combining this solution with the solution of the diazonium salt and adjusting the pH at a value of from 4 to 6. After the reaction had been completed, the dyestuff solution was acidified and was salted out by adding potassium chloride. The dyestuff was filtered off, the moist filter cake was dissolved in a little water, was adjusted with sodium hydroxide solution at a pH value of from 6 to 7, and the solution was spray-dried. 80 Parts by weight of a salt-containing light brown powder were obtained which — in the form of the free acid — had the formula

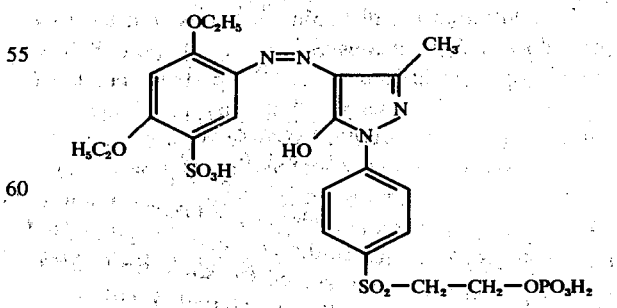

The prints obtained on nitrogen — containing fibers and cellulose fibers, in the presence of agents having an alkaline reaction, showed all the good fastness properties mentioned in Example 1. Printing pastes and padding liquors of the dyestuff which contained agents having an alkaline reaction, could be stored for several months at a temperature of about 20° C.

EXAMPLE 9

56.3 Parts by weight of the dyestuff prepared according to Example 3 were introduced into a mixture of 400 parts by volume of N-methyl-pyrrolidone and 2 parts by volume of N-dimethyl-formamide and were dissolved at room temperature, while stirring. In the course of 1 hour, 73 parts by volume of thionylchloride were added dropwise, in which process the temperature of the reaction mixture rose to 60° – 70° C without external cooling. The reaction mixture was then stirred again for 30 minutes, the temperature being maintained at 50 to 60° C, and the suspension formed was then poured into a mixture of 1000 parts by volume of water and 600 parts by weight of ice, while stirring thoroughly. After another hour the reaction mixture was suction-filtered, and the residue was washed three times with 200 parts by volume each of sodium hydroxide solution of 5% strength. The filter residue was then dried at a temperature of from 50° to 60° C in vacuo. 54.5 Parts by weight of a yellowish-brown dyestuff powder were obtained which — in the form of the free acid — had the formula

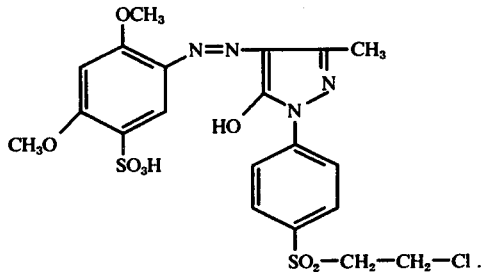

The prints obtained on nitrogen-containing fibers and cellulose fibers in the presence of agents having an alkaline reaction showed all the good fastness properties mentioned above in Example 1.

We claim:
1. Monoazo compound being in the form of the free acid of the formula

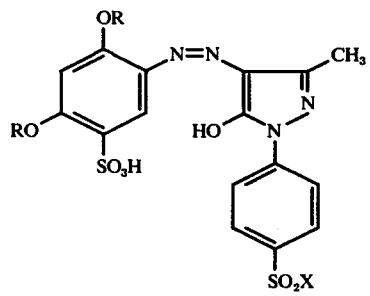

in which R is alkyl of 1 to 4 carbon atoms and X is vinyl or β-sulfatoethyl.

2. The monoazo compound being in the form of the free acid of the formula

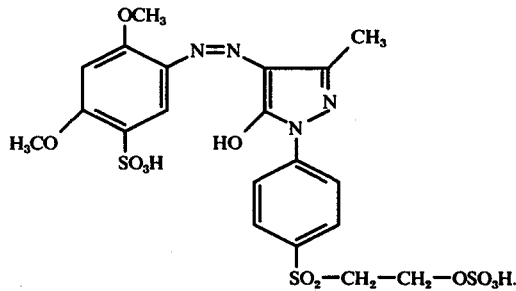

* * * * *